(12) United States Patent
Ichihara et al.

(10) Patent No.: US 8,783,922 B2
(45) Date of Patent: Jul. 22, 2014

(54) DISPLAY DEVICE AND METER DEVICE USING SAME

(75) Inventors: Hiroaki Ichihara, Kariya (JP); Masaharu Kinoshita, Kariya (JP); Yoshifumi Tatsuta, Kariya (JP); Takahiro Shimada, Shimada (JP); Koji Nomura, Toyota (JP); Masato Minakata, Toyota (JP); Koji Aikawa, Nagoya (JP)

(73) Assignees: Toyota Shatai Kabushiki Kaisha, Kariya-shi, Aichi-ken (JP); Yazaki Corporation, Tokyo (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 79 days.

(21) Appl. No.: 13/512,284

(22) PCT Filed: Nov. 30, 2009

(86) PCT No.: PCT/JP2009/070115
§ 371 (c)(1),
(2), (4) Date: May 25, 2012

(87) PCT Pub. No.: WO2011/064887
PCT Pub. Date: Jun. 3, 2011

(65) Prior Publication Data
US 2012/0262901 A1 Oct. 18, 2012

(51) Int. Cl.
*B60Q 1/00* (2006.01)
(52) U.S. Cl.
USPC ............................ 362/489; 362/583; 362/293
(58) Field of Classification Search
USPC .......................................... 362/489, 583, 293
See application file for complete search history.

(56) References Cited

U.S. PATENT DOCUMENTS

| 4,771,368 A | 9/1988 | Tsukamoto et al. |
| 7,494,256 B1 * | 2/2009 | Kelman et al. ................ 362/489 |
| 2006/0062004 A1 * | 3/2006 | Birman ......................... 362/487 |

FOREIGN PATENT DOCUMENTS

| DE | 3704574 A1 | 8/1987 |
| JP | 63-197734 U | 12/1988 |
| JP | 64-038675 U | 3/1989 |
| JP | 6-071261 U | 10/1994 |
| JP | 07-047868 | 2/1995 |
| JP | 7-304352 A | 11/1995 |
| JP | 2000-016118 A | 1/2000 |

(Continued)

OTHER PUBLICATIONS

International Search Report and Written Opinion issued in PCT/JP2009/070115, mailed Dec. 28, 2009, 6 pages (with English Translation of Written Opinion).

(Continued)

*Primary Examiner* — Evan Dzierzynski
(74) *Attorney, Agent, or Firm* — Faegre Baker Daniels LLP

(57) ABSTRACT

Disclosed is a display device capable of achieving a decorative effect by utilizing a color filter at the front of a light-emitting display unit. Also disclosed is a meter device using the display device. Specifically disclosed is a display device comprising a light-emitting display unit and a color filter, which is arranged at the front of the light-emitting display unit. A light-emitting element for decoration is provided on the outside of the light-emitting display unit. The color filter is provided with a light-discharging surface for discharging the light from the light-emitting element for a decorative appearance in the forward direction.

6 Claims, 4 Drawing Sheets

(56) References Cited

FOREIGN PATENT DOCUMENTS

| | | |
|---|---|---|
| JP | 2000-161118 A | 1/2000 |
| JP | 2001-281007 A | 10/2001 |
| JP | 2002-351358 A | 12/2002 |
| JP | 2003-057629 A | 2/2003 |
| JP | 2004-361664 A | 12/2004 |
| JP | 2005-084153 A | 3/2005 |
| JP | 2005-233276 A | 9/2005 |
| JP | 2006-59565 A | 3/2006 |
| JP | 2006-145334 A | 6/2006 |
| JP | 2006-350147 A | 12/2006 |
| JP | 2008-261664 A | 10/2008 |

OTHER PUBLICATIONS

International Preliminary Report on Patentability issued in PCT/JP2009/070115, Jul. 10, 2012, 5 pages (English translation).

European Search Report issued in EP Application No. 09851677 mailed May 21, 2014, 6 pages.

* cited by examiner

DISPLAY DEVICE AND METER DEVICE USING SAME

FIELD OF THE INVENTION

The present invention relates to a display device used in a meter device, which displays travelling states such as vehicle speed in a passenger vehicle or the like, and a meter device using the display device.

BACKGROUND OF THE INVENTION

Conventionally, for this type of display devices, configurations as disclosed in Patent Documents 1 to 3 have been proposed.

In a conventional configuration described in Patent Document 1, a plurality of panel switches are arranged around a liquid crystal panel, and a light guide lens is arranged between the liquid crystal panel and the panel switches. Light from the liquid crystal panel is guided to the panel switches via the light guide lens to illuminate the panel switches. Thus, in Patent Document 1, a light source dedicated to illuminate the panel switches is not required.

In a conventional configuration described in Patent Document 2, a light control means is provided between a plurality of light sources for vehicle speed display and a plurality of light sources for a shift range display. The light control means allows light from the light sources for vehicle speed display to be radiated to a shift range display, which serves as backlight for the shift range display. In contrast, light from the light sources for the shift range display is prevented from being radiated to the vehicle speed display, thereby preventing illumination unevenness in the vehicle speed display.

In a conventional configuration described in Patent Document 3, a front surface of a light shielding case having a meter therein is coated with a transparent case. A corner portion between a front wall portion and a side wall portion of the transparent case has a reflection portion for reflecting external light (light of a head lamp) entering from an edge of the side wall portion outward without allowing the light to pass to the front wall portion. This reflection portion shields the external light entering the light shielding case through the transparent case, thereby suppressing illumination unevenness in a meter display.

In a conventional configuration described in Patent Document 4, light from a light source is reflected on two reflection portions through an air layer to allow a front panel of a meter to perform surface-emitting. With this configuration, since an illumination chamber formed of an air layer can be formed, the whole of the front panel can be illuminated without using any planar illuminant, achieving cost reduction.

In the conventional configuration described in Patent Document 5, a reflecting mirror is provided at the rotational center of an indicator of a tachometer, and display light indicating vehicle travelling speed is emitted from a display to the reflecting mirror through a smoke glass so that the driver can see the travelling speed from display reflected by reflected light. With this configuration, since there is no need to provide a smoke glass in front of the meter, visibility of the tachometer indicator is ensured.

Patent Document 1: Japanese Laid-Open Patent Publication No. 2006-59565

Patent Document 2: Japanese Laid-Open Patent Publication No. 2006-145334

Patent Document 3: Japanese Laid-Open Patent Publication No. 2000-16118

Patent Document 4: Japanese Laid-Open Patent Publication No. 2001-281007

Patent Document 5: Japanese Laid-Open Patent Publication No. 2005-233276

However, each of the conventional configurations has the following problems.

In the configuration described in Patent Document 1, the whole of the panel switches is illuminated by light from the liquid crystal panel. Illumination of the panel switches in Patent Document 1 utilizes light of a liquid crystal display screen. Accordingly, the light amount of the switches depends on the light amount of the backlight for the liquid crystal screen to display the switches. Thus, when it is attempted to increase the light amount of the switches, the liquid crystal display screen becomes too bright. Accordingly, in the case of adopting this configuration for decorative illumination, it is difficult to obtain a desired decorative design due to limitations by brightness of the liquid crystal display screen or the like. Moreover, in the configuration described in Patent Document 1, an area for ensuring switch light is required in the liquid crystal screen, resulting in an increase in the whole of the liquid crystal display device in size. Further, in the case where this configuration is adopted to perform decorative illumination away from the liquid crystal screen, a long light guide lens is needed, and it is difficult to incorporate such a light guide lens in the limited space in the display device.

In the configuration described in Patent Document 2, the whole of the shift range display is illuminated by light from the light sources for vehicle speed display, which is effective in preventing illumination unevenness. However, it is difficult to satisfactorily display the vehicle speed and supply decorative illumination at the same time. Moreover, in the configuration described in Patent Document 2, the light control means for controlling light is needed to be provided between the plurality of light sources for vehicle speed display and the plurality of light sources for the shift range display, which makes the configuration complicated.

In the configuration described in Patent Document 3, the transparent case is provided with the reflection portion for shielding external light. That is, the configuration in Patent Document 3 serves to prevent light from entering into the case, not to utilize light, and therefore, the decorative effect of illumination cannot be expected.

In the configuration described in Patent Document 4, the reflection portion (in this embodiment, the prism-like portion) dedicated to guide light from the light source to the front panel of the meter is required. Despite the fact that cost reduction can be achieved, the number of components increases and the configuration becomes complicated. Moreover, in the configuration described in Patent Document 4, in the case of performing a decorative function, decorative and display functions need to be satisfied at the same time and thus, as described above, a desired decorative design cannot be ensured.

In the configuration described in Patent Document 5, since it is needed to provide the dedicated large and expensive reflecting mirror at the rotational center of the indicator of the tachometer, the number of components increases and moreover, unless the reflection angle of the reflecting mirror is accurately set, the display screen may be distorted. For this reason, the configuration described in Patent Document 5 inevitably leads to high costs. Also in the configuration described in Patent Document 5, in the case of performing a decorative function, decorative and display functions need to be satisfied at the same time and thus, as described above, a desired decorative design cannot be ensured.

The present invention is made in consideration of the problems in such conventional techniques. An objective of the present invention is to provide a display device capable of effectively achieving a decorative effect by utilizing a portion of a color filter at the front of a light-emitting display unit with a simple configuration, and a meter device using the display device.

SUMMARY OF THE INVENTION

To achieve the foregoing objective and in accordance with one aspect of the present invention, a display device is provided that includes a light-emitting display unit and a color filter arranged at the front of the light-emitting display unit. The device is characterized in that a light-emitting element is provided in the outside of the light-emitting display unit, and a light-discharging surface for discharging light from the light-emitting element in a forward direction is formed at an end of the color filter.

Therefore, in the display device according to the present invention, when the light-emitting element emits light, the light-discharging surface of the color filter discharges light received from the light-emitting element. Since the color filter arranged at the front of the light-emitting display unit is locally utilized to perform decorative illumination, the decorative effect can be obtained without increasing the number of components. Moreover, since decorative illumination can be made independent from display illumination, a desired decorative effect can be obtained.

In the above described display device, a reflecting surface is preferably provided in a light path of the light-emitting element, and light from the light-emitting element preferably reaches the light-discharging surface through the reflecting surface.

In the above described display device, the light-discharging surface is preferably formed by roughening an end of the color filter.

A meter device according to the present invention is characterized in that the above described display device is incorporated in an opening of a vehicle instrument panel, the light-emitting display unit displays the vehicle travelling state, and a transparent front plate is provided in the opening so as to cover the color filter.

Therefore, the meter device according to the present invention can improve the decorative effect in displaying the vehicle driving state.

In the above described meter device, the reflecting surface is preferably provided at a portion of the display device or a vehicle component.

In the above described meter device, the color filter is preferably provided with a wall portion for preventing light from the reflecting surface from leaking to a back surface of the color filter.

In the above described meter device, the color filter and the front plate are preferably subjected to smoke processing.

Effects of the Invention

As described above, according to the present invention, in decorative illumination, a highly decorative effect can be obtained even with a simple configuration.

DETAILED DESCRIPTION OF THE INVENTION

A vehicle meter device according to one embodiment of the present invention will be described with reference to the drawings.

Figure 1:
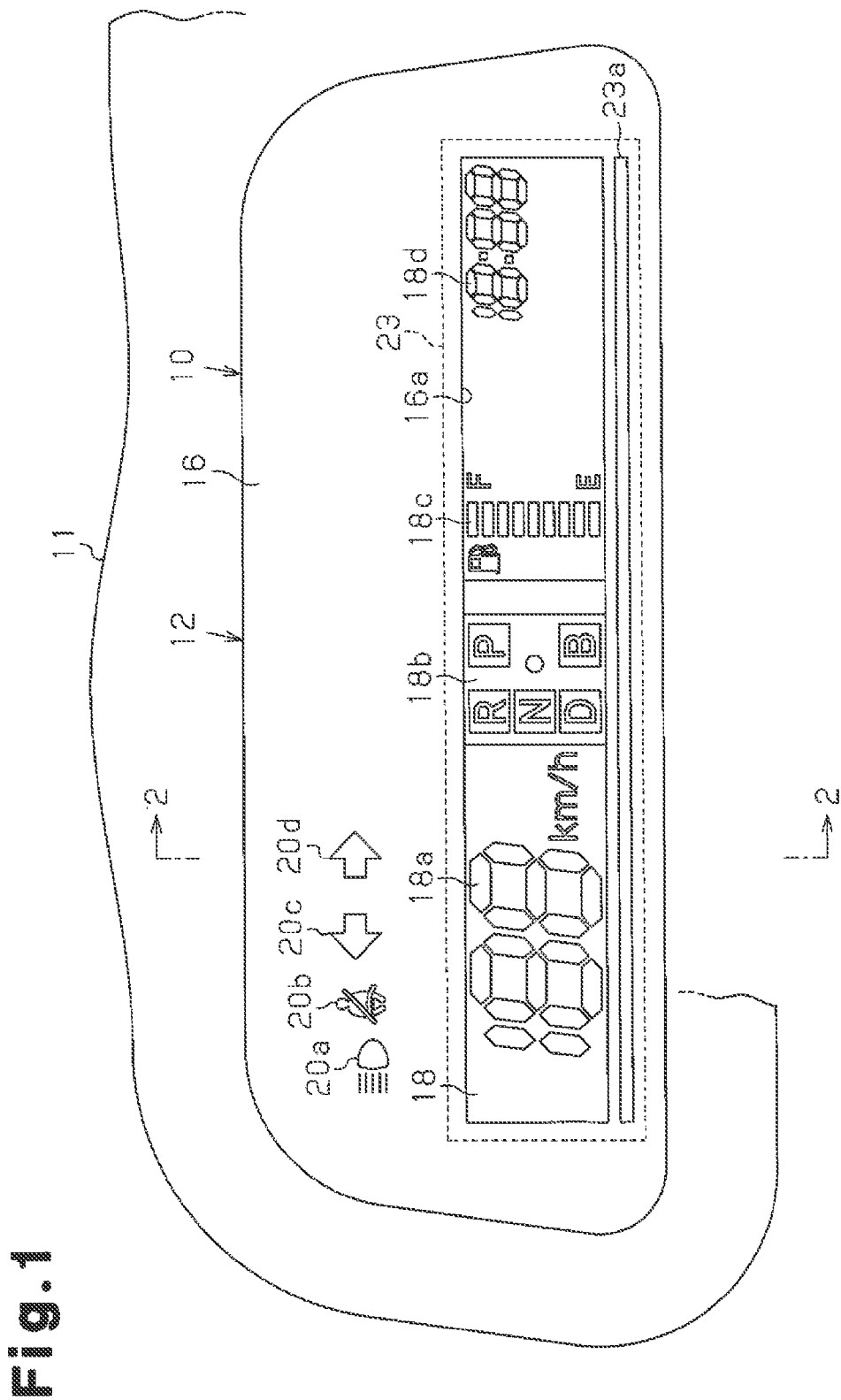
FIG. 1 is a front view showing a display device according to one embodiment of the present invention.
Figure 2:
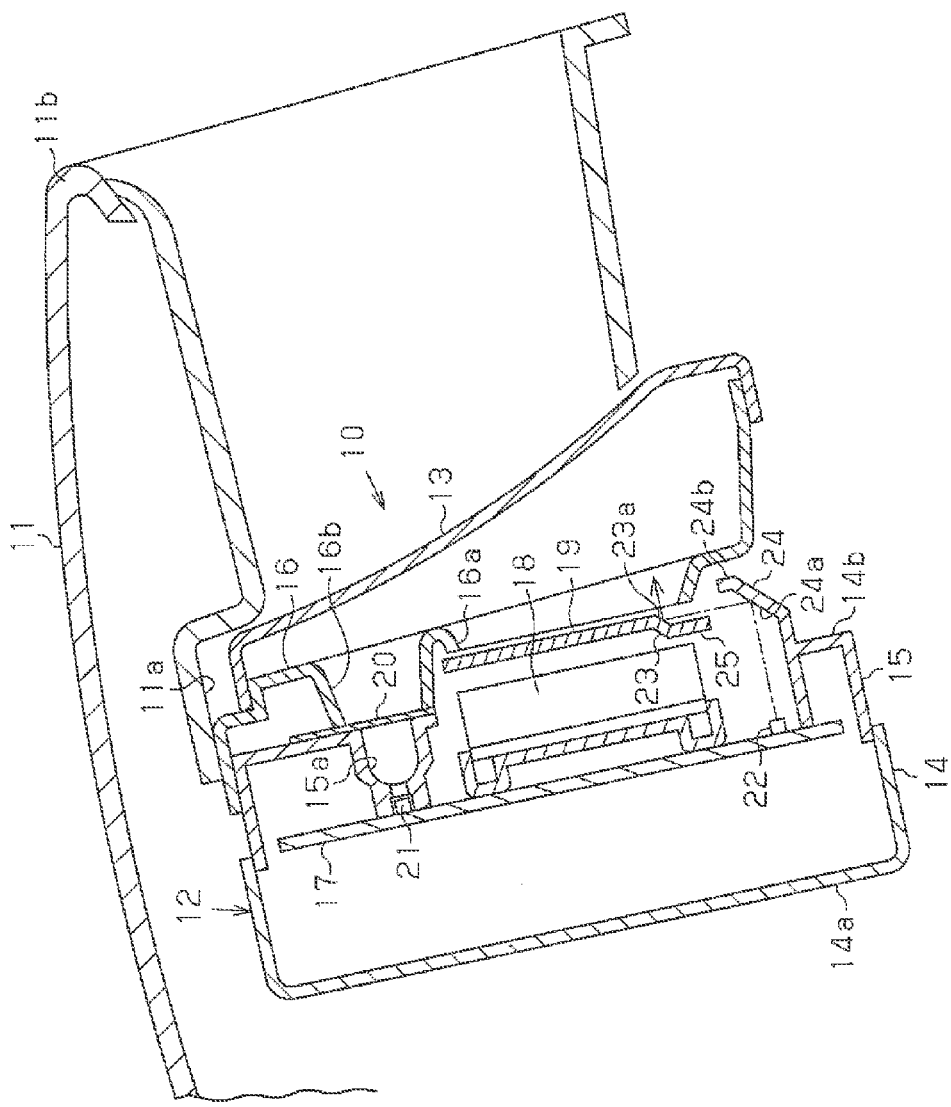
FIG. 2 is an enlarged cross-sectional view taken along a line 2-2 in FIG. 1, showing a state where the display device is incorporated in a vehicle instrument panel.

As shown in FIGS. 1 and 2, a meter device 10 in this embodiment is installed in an opening 11a of a vehicle instrument panel 11, and a display device 12 is incorporated thereinto. The meter device is located in the opening 11a below a hood portion 11b of the instrument panel 11, and a front plate 13 formed of a transparent plate is arranged at a front frame 16 of the meter device 10 so as to cover a color filter 19 of the display device 12. The front plate 13 is subjected to smoke processing for setting a predetermined transmittance (for example, 33%) with respect to the brightness of a luminous source.

The display device 12 includes a case 15 configured of a horizontally long box-like rear case member 14a, the front of which is opened, and a front case member 14b assembled to the front opened portion of the rear case member 14a. A plurality of light guiding portions 15a are formed in a front upper portion of the front case member 14b so as to arrange the light guiding portions 15a at intervals in a horizontal direction when viewed from the front. The front frame 16 is attached to the front of the front case member 14b. A horizontally long display window 16a is formed in a front lower portion of the front frame 16. A display hole 16b corresponding to each of the light guiding portions 15a of the front case member 14b is formed in the front upper portion of the front frame 16.

As shown in FIG. 2, a circuit board 17, which mounts control components and operating components for the display device 12, is arranged in the case 15. A light-emitting display unit 18 formed of a VFD (Vacuum Fluorescent Display) is arranged at the front of the circuit board 17 so as to correspond to the display window 16a of the front frame 16. As shown in FIG. 1, the light-emitting display unit 18 is provided with a plurality of displays formed of light-emitting elements for displaying the vehicle driving state, and in this embodiment, a vehicle speed display 18a, a shift position display 18b, a fuel level display 18c and a time display 18d are provided. The color filter 19 (e.g. pale red) for converting light of the display elements of the light-emitting display unit 18 (e.g. green) into light of color with less stimulus (e.g. white) is arranged at the front of the light-emitting display unit 18. The color filter 19 is subjected to smoke processing for setting a predetermined transmittance (for example, about 25%) with respect to brightness of a luminous source.

As shown in FIG. 2, a display plate 20 is arranged between the light guiding portions 15a of the front case member 14b and the display hole 16b of the front frame 16. The display plate 20 is colored black except for display marks, which will be discussed below. As shown in FIG. 1, a plurality of translucent display marks for displaying the vehicle driving state, such as a lamp illumination mark 20a, a seatbelt reminder mark 20b, a left blinker mark 20c and a right blinker mark 20d, are assigned at positions corresponding to each of the light guiding portions 15a of the display plate 20. A plurality of display light-emitting elements 21 are arranged at the front of the circuit board 17 so as to correspond to the light guiding portions 15a of the front case member 14b. The display light-emitting elements 21 emit light, thereby displaying the display marks 20a to 20d on the display plate 20 in a standing out manner. The display marks 20a to 20d are invisible in the state where the display light-emitting elements 21 do not emit light. The front frame 16 is jet-black and thus, is almost invisible, and the boundary between the front frame 16 and the display plate 20 is also invisible.

Figure 3:
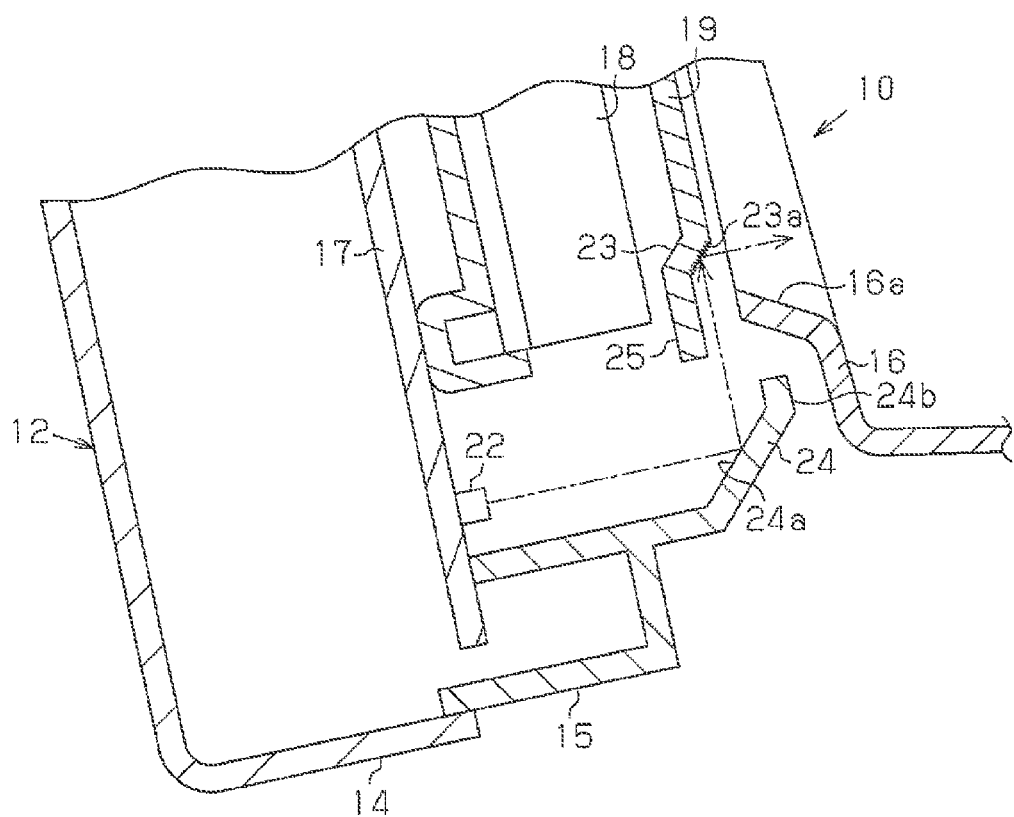
FIG. 3 is an enlarged partial cross-sectional view showing a part in FIG. 2.

As shown in FIGS. 2 and 3, in an outer lower portion of the light-emitting display unit 18, a plurality of decorative (illumination) light-emitting elements 22 are horizontally arranged at the front of the circuit board 17. An inclined portion 23 is formed at a lower end of the color filter 19, and a light-discharging surface 23a for discharging light from the decorative light-emitting elements 22 is formed at the front of the inclined portion 23 so as extend in the horizontal direction. The light-discharging surface 23a is formed by roughening the front surface of the inclined portion 23, for example, by applying fine grain finishing.

An inclined reflection portion 24 is formed at lower front end of the front case member 14b so as to be located in a light path from the decorative light-emitting elements 22 to the light-discharging surface 23a. A reflecting surface 24a for reflecting light from the decorative light-emitting elements 22 and allowing the light to reach the light-discharging surface 23a is formed in the inner surface of the reflection portion 24. The reflecting surface 24a is formed by applying mirror-like finishing such as metal evaporation and metal plating to the inner surface of the reflection portion 24. A barrier portion 24b protrudes from an upper end of the reflection portion 24, preventing excessive light from the decorative light-emitting elements 22 from leaking in the forward direction.

A wall portion 25 protruding downward is provided at a lower end of the color filter 19 so as to be connected to the inclined portion 23. The existence of the wall portion 25 prevents light from the reflecting surface 24a from leaking to the back surface of the color filter 19.

Next, operation of the vehicle meter device thus configured will be described.

During driving of the vehicle, the driving state is displayed through light emission of the displays 18a to 18d of the light-emitting display unit 18 and light emission of the display marks 20a to 20d by the display light-emitting elements 21. In this case, display light of the light-emitting display unit 18 is converted into light of color that has less visual stimulus but is highly visible through the color filter 19. In displaying the driving state, the decorative light-emitting elements 22 emit light, and the light is guided to the light-discharging surface 23a below the color filter 19 through the reflecting surface 24a and then, the decorative light is discharged from the light-discharging surface 23a in the forward direction. Therefore, the display device 12 can achieve an excellent decorative effect.

This embodiment achieves the following advantages.

(1) In this embodiment, the light-discharging surface 23a for discharging light from the decorative light-emitting elements 22 through the reflecting surface 24a in the forward direction is formed at the lower end of the color filter 19 arranged at the light-emitting display unit 18. For this reason, the decorative effect of the display device 12 can be obtained by utilizing the color filter 19 for the light-emitting display unit 18. Further, since the decorative light-emitting elements 22 can be used only for decorative illumination, not for display, a highly decorative effect can be obtained.

(2) In this embodiment, since the barrier portion 24b of the reflection portion 24 prevents excessive light from the light-emitting display unit 18 to leak in the forward direction, loss of the decorative effect can be prevented.

(3) In this embodiment, the reflecting surface 24a is formed in the light path of the decorative light-emitting elements 22, and light from the decorative light-emitting elements 22 reaches the light-discharging surface 23a through the reflecting surface 24a. For this reason, even when the decorative light-emitting elements 22 are located separately from the light-discharging surface 23a, light from the decorative light-emitting elements 22 can be guided to the light-discharging surface 23a through the reflecting surface 24a. Accordingly, since the decorative light-emitting elements 22 can be incorporated at positions where they cannot be viewed from the outside and they can be easily mounted, excellent appearance can be obtained and the whole of the device can be reduced in size.

(4) In this embodiment, the light-discharging surface 23a is formed by roughening the inclined portion 23 arranged at the end of the color filter 19. For this reason, the light-discharging surface can be formed without greatly changing the configuration of the color filter 19.

(5) In this embodiment, the reflecting surface 24a is provided in a portion of the front case member 14b of the display device 12. For this reason, there is no need to arrange a dedicated reflection member having a reflecting surface in the light path of the decorative light-emitting elements 22, which contributes to a simple configuration.

(6) In this embodiment, the color filter 19 is provided with the wall portion 25 for preventing light from the reflecting surface 24a from leaking to the back surface of the color filter 19. For this reason, the light from the reflecting surface 24a is prevented from leaking to the back surface of the color filter 19. This reduces the possibility that display unevenness due to shading or contrast occurs in display of the vehicle driving state by the light-emitting display unit 18.

(7) In this embodiment, the color filter 19 and the front plate 13 are subjected to smoke processing. For this reason, undesirable parts of the meter device 10 in appearance, for example, structures such as printing pattern on the light-emitting display unit 18 and fastening screws are hidden, and the vehicle driving state can be clearly displayed. In contrast, when the front plate 13, which is not subjected to smoke processing, is used, the smoke opacity lacks and thus, the undesirable parts in appearance are visually recognized. This problem can be addressed only by increasing the smoke opacity of the color filter. However, in this case, the function of the color filter is degraded and the display brightness of each of the displays 18a to 18d in the light-emitting display unit 18 cannot be ensured. This embodiment can avoid these problems.

Modifications

The embodiment may be modified as follows.

Figure 4:
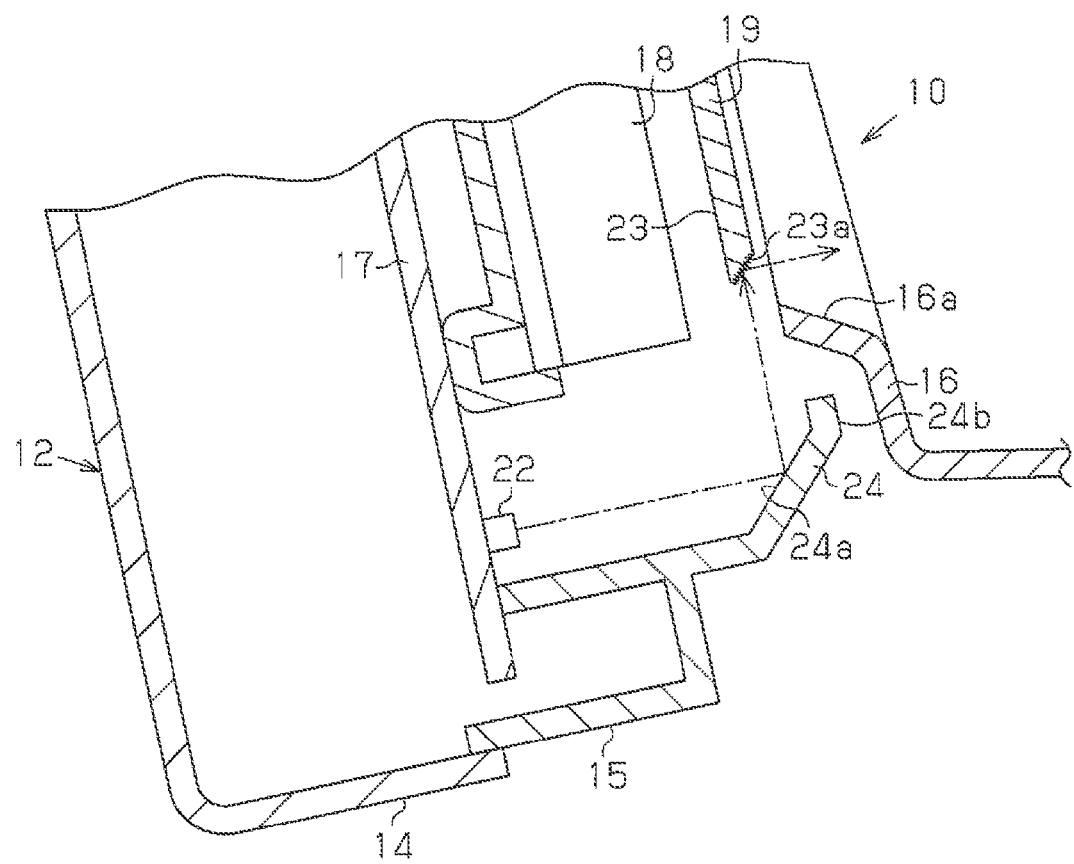
FIG. 4 is a partial cross-sectional view showing a modification.

As shown in FIG. 4, the light-discharging surface 28a may be provided in a lower end surface of the color filter 19, and the wall portion 25 may be omitted.

Although the light-discharging surface 23a is formed by roughening the inclined portion 23 of the color filter 19 in the embodiment, the light-discharging surface 23a may be formed by applying metal plating to the inclined portion 23 or adhering a reflective sheet to the inclined portion 23.

Although the reflecting surface 24a is provided at a part of the front case member 14b of the display device 12 in this embodiment, the reflecting surface 24a may be provided at a part of a vehicle component such as the instrument panel 12.

Although the reflecting surface 24*a* is provided at a part of the front case 15 in this embodiment, the reflecting surface 24*a* may be provided at the reflecting plate.

The front plate 13 that is not subjected to smoke processing may be used in the meter device 10.

The invention claimed is:

1. A display device comprising:

a light-emitting display unit; and a color filter arranged at the front of the light-emitting display unit, wherein a light-emitting element is provided in the outside of the light-emitting display unit, and a light-discharging surface for discharging light from the light-emitting element in a forward direction is formed at an end of the color filter and the light-discharging surface is formed by roughening an end of the color filter.

2. The display device according to claim 1, wherein a reflecting surface is provided in a light path of the light-emitting element, and light from the light-emitting element reaches the light-discharging surface through the reflecting surface.

3. A meter device, wherein the display device according to claim 1 is incorporated in an opening of a vehicle instrument panel, wherein the light-emitting display unit displays the vehicle travelling state, and a transparent front plate is provided in the opening so as to cover the color filter.

4. The meter device according to claim 3, wherein the reflecting surface is provided at a portion of the display device or a vehicle component.

5. The display device according to claim 1, wherein the color filter is provided with a wall portion for preventing light from the reflecting surface from leaking to a back surface of the color filter.

6. The meter device according to 3, wherein the color filter and the front plate are subjected to smoke processing.

* * * * *